United States Patent
Uraki

(10) Patent No.: US 7,225,112 B2
(45) Date of Patent: May 29, 2007

(54) CONVERSION CHECK DEVICE, CONVERSION CHECK METHOD, AND PORTABLE STORAGE MEDIUM THEREFOR

(75) Inventor: Yasushi Uraki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 683 days.

(21) Appl. No.: 10/646,862

(22) Filed: Aug. 25, 2003

(65) Prior Publication Data
US 2004/0122635 A1    Jun. 24, 2004

(30) Foreign Application Priority Data
Aug. 30, 2002 (JP) .............................. 2002-255803

(51) Int. Cl.
*G06F 17/50* (2006.01)
*G06T 17/50* (2006.01)
(52) U.S. Cl. .............................. 703/2; 703/9; 345/418; 345/423
(58) Field of Classification Search .................... 703/2, 703/7, 9; 345/418, 420–423, 606; 716/4, 716/20
See application file for complete search history.

(56) References Cited

U.S. PATENT DOCUMENTS

| | | | | |
|---|---|---|---|---|
| 5,819,070 A | * | 10/1998 | Sasaki | 703/13 |
| 5,844,564 A | * | 12/1998 | Bennis et al. | 345/423 |
| 6,069,971 A | * | 5/2000 | Kanno et al. | 382/144 |
| 6,642,929 B1 | * | 11/2003 | Essafi et al. | 345/581 |
| 6,807,654 B2 | * | 10/2004 | Akutagawa et al. | 716/4 |
| 6,943,790 B2 | * | 9/2005 | Taubin | 345/420 |
| 2003/0011589 A1 | * | 1/2003 | Desbrun et al. | 345/418 |
| 2005/0280656 A1 | * | 12/2005 | Maillot | 345/606 |

FOREIGN PATENT DOCUMENTS

| | | |
|---|---|---|
| JP | 09204532 | 8/1997 |
| JP | 2001229407 | 8/2001 |
| JP | 2002215696 | 8/2002 |

* cited by examiner

*Primary Examiner*—Thai Phan
(74) *Attorney, Agent, or Firm*—Staas & Halsey LLP

(57) ABSTRACT

A conversion check apparatus and a conversion checking method notifies an operator of a difference between a generated analytic model and a three-dimensional model before conversion. The difference in volume between the original three-dimensional model before conversion and the analytic model after conversion by the data conversion unit is obtained by a volume calculation facility unit, the difference in surface area is obtained by a surface area calculation facility unit, and the difference in barycenter position is obtained by the barycenter calculation facility unit. The obtained results are displayed on a conversion check display facility unit. Based on the displayed contents, the operator can appropriately evaluate the analytic model.

11 Claims, 13 Drawing Sheets

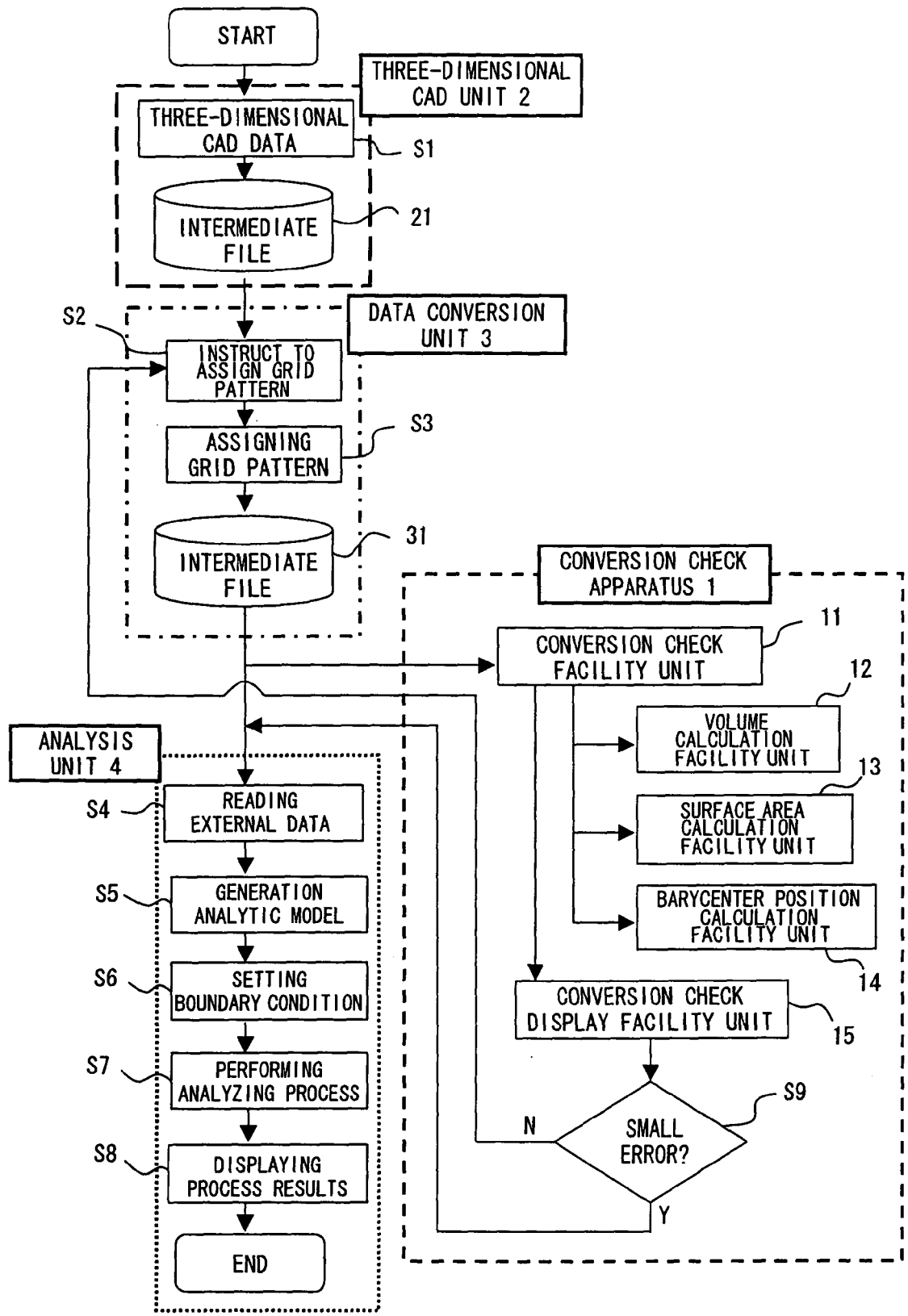
F I G. 2

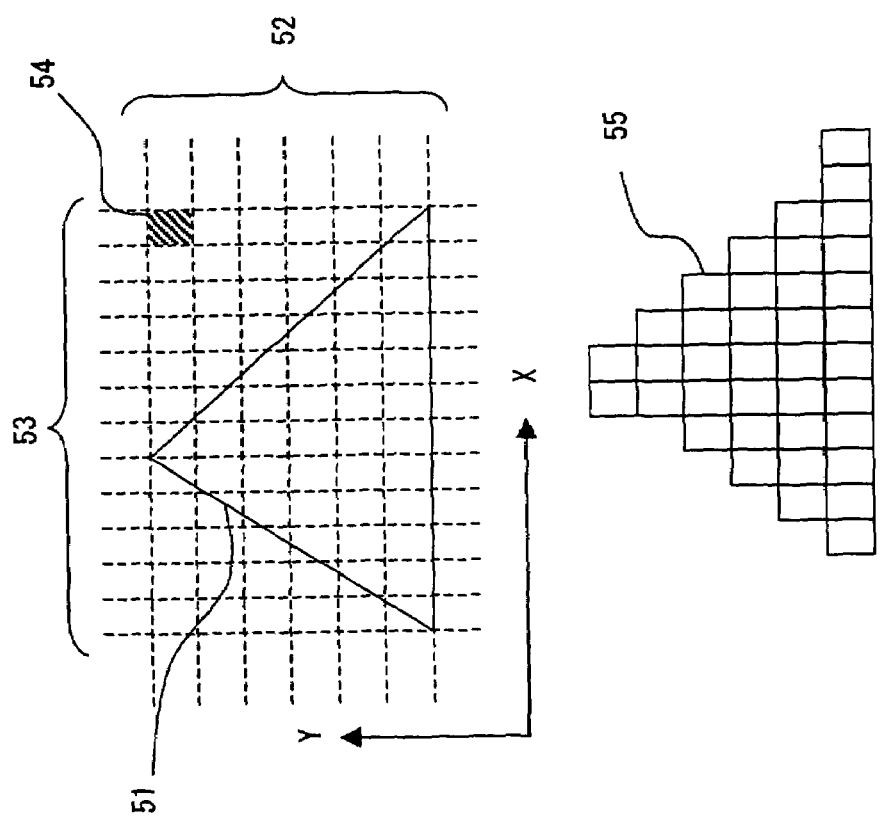
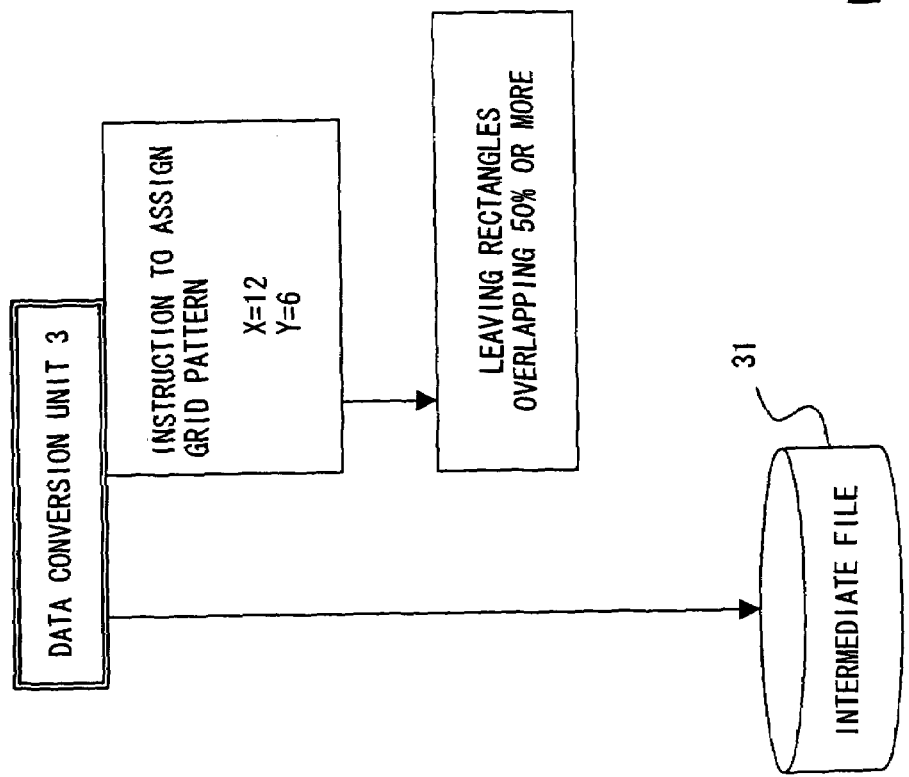
FIG. 4

DATA STRUCTURE AFTER ASSIGNING GRID PATTERN (EXAMPLE)

| RECTANGLE NUMBER | COORDINATE NUMBER 1 | | | ... | COORDINATE NUMBER 8 | | |
|---|---|---|---|---|---|---|---|
| | COORDINATES X1 | COORDINATES Y1 | COORDINATES Z1 | ... | COORDINATES X8 | COORDINATES Y8 | COORDINATES Z8 |
| 1 | 0.0 | 0.0 | 0.0 | ... | 10.0 | 10.0 | 10.0 |
| 2 | 10.0 | 0.0 | 0.0 | ... | 20.0 | 10.0 | 10.0 |
| 3 | | | | | | | |
| 4 | | | | | | | |
| 5 | | | | | | | |
| · | | | | | | | |
| n | | | | | | | |

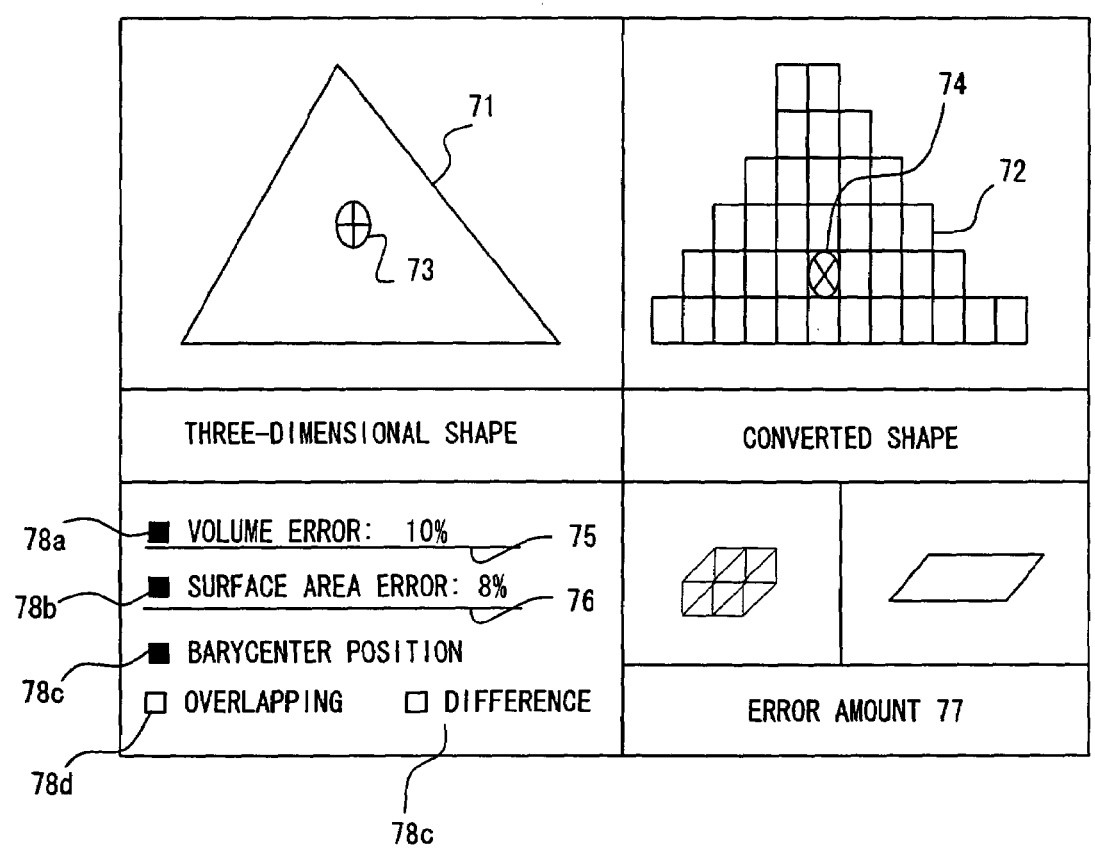
F I G. 9

CONVERSION CHECK DEVICE, CONVERSION CHECK METHOD, AND PORTABLE STORAGE MEDIUM THEREFOR

BACKGROUND OF THE INVENTION

1. Field of the Invention

The present invention relates to the technology of checking used in converting product shape data generated by three-dimensional CAD, etc.

2. Description of the Related Art

In product development, etc., various analyses such as a thermal fluid analysis, etc. are conducted to evaluate a structure generated by three-dimensional CAD, etc. To perform these analyses, the product shape data generated by three-dimensional CAD, etc. are converted into an analytic model appropriate for the analyses, and the analyses are conducted on the analytic model.

FIGS. 1A, 1B, 1C and 1D show examples of converting a three-dimensional model based on the product shape data into an analytic model.

These figures show examples of converting a structure of a three-dimensional model based on the product shape data generated by three-dimensional CAD into an analytic model. FIG. 1A shows the front view of a three-dimensional model before conversion. FIG. 1B shows the reverse side of the three-dimensional model before conversion. FIG. 1C shows the front view of the three-dimensional model after conversion. FIG. 1D shows the reverse side of the three-dimensional model after conversion.

An analytic model is generated by dividing an original three-dimensional model by assigning a grid pattern to it and determining the validity of each rectangle element. Therefore, as shown in FIG. 1, an analytic model has an error between the original three-dimensional model in shape, area, volume, etc.

Since an analytic model obtained by conversion has an error in shape, area, volume, etc., it is probable the analytic model cannot be used in an analyzing process depending on the level of the error. The determination as to whether or not the analytic model can be used in the analyzing process has been conventionally made based on the empirical rule of an operator.

That is, conventionally, three-dimensional models before and after conversion have been displayed as shown in FIG. 1, and an operator visually checks the state of its shape, and sensuously determines the acceptability of the analytic model. Therefore, for lack of quantitative determination standards, and due to personal discretion, the subsequent analysis result largely depends on the operator who normally continues the process. As a result, there has been the demerit that the accuracy (reliability) of the analysis result is affected by the sense of each operator.

SUMMARY OF THE INVENTION

The present invention aims at providing a conversion check apparatus and a conversion checking method capable of notifying an operator of a difference between a generated analytic model and an original three-dimensional model, and allowing the operator to easily determine whether or not the analytic model can be used in an analyzing process.

The conversion check apparatus according to the present invention is based on the premise that an analytic model generated by converting a three-dimensional model for use in an analyzing process, and includes a computation unit and a conversion check display unit.

A calculation unit obtains a difference between the analytic model and the three-dimensional model. The calculation unit includes at least one of, for example, a volume calculation facility unit for obtaining a difference in volume between the analytic model and the three-dimensional model, a surface area calculation facility unit for obtaining a difference in surface area between the analytic model and the three-dimensional model, and a barycenter calculation facility unit for obtaining a difference in barycenter position between the analytic model and the three-dimensional model.

The conversion check display unit displays the difference. The difference includes at least one of, for example, the above mentioned differences in volume, surface area, and barycenter position.

The present invention also includes the conversion checking method and the portable storage medium in its scope.

Since the present invention can display the difference between an original three-dimensional model and an analytic model converted for use in an analyzing process, the operator can appropriate and quickly determine the evaluation of the analytic model based on the difference.

BRIEF DESCRIPTION OF THE DRAWINGS

FIG. 2 shows a configuration of the system and the entire process procedure according to an embodiment of the present invention;

FIG. 4 shows the details of the process performed by the data conversion unit;

FIG. 9 shows an example of a first display screen of a check result displayed by the conversion check display facility unit;

DESCRIPTION OF THE PREFERRED EMBODIMENT

Figure 1A:
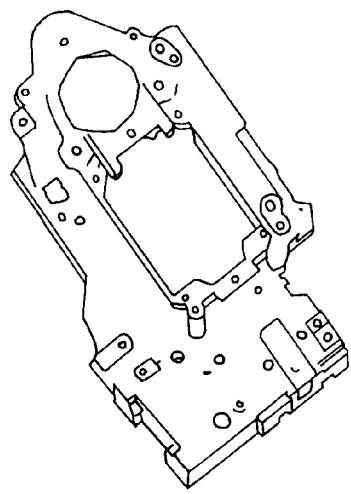
FIGS. 1A, 1B, 1C, and 1D show examples of converting a three-dimensional model based on product shape data into an analytic model.
Figure 1B:
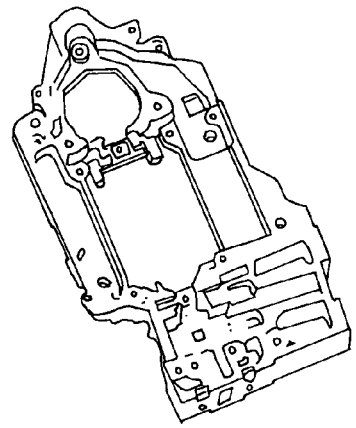
Figure 1C:
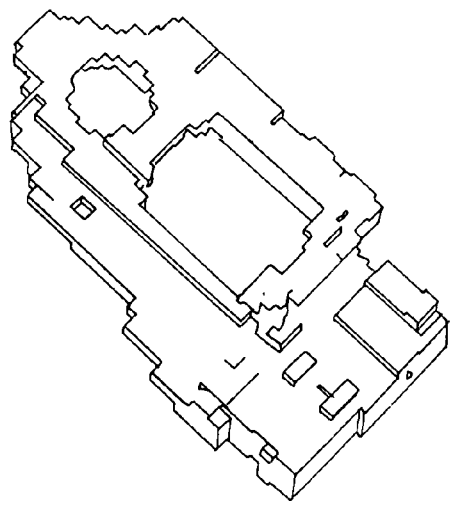
Figure 1D:
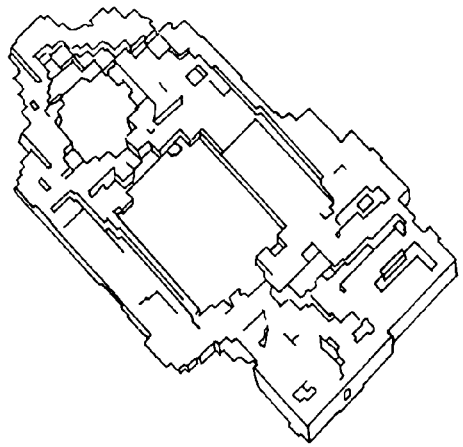

FIG. 2 shows a configuration of the system and the entire process procedure according to an embodiment of the present invention. The system shown in FIG. 2 comprises a conversion check apparatus 1, a three-dimensional CAD unit 2, a data conversion unit 3, and an analysis unit 4. The conversion check apparatus 1, the three-dimensional CAD unit 2, the data conversion unit 3, and the analysis unit 4 can be realized as independent devices or on one or more computers by a computer program.

The three-dimensional CAD unit 2 is used by an operator in performing a process of generating a three-dimensional model of a structure. When the operator input an instruction using an input appliance such as a mouse, etc. on the screen, the unit generates a three-dimensional CAD data (product shape data) at the instruction (step S1), and outputs it as an intermediate file 21.

The data conversion unit 3 converts the three-dimensional CAD data stored as the intermediate file 21 by the three-dimensional CAD unit 2 into the data of an analytic model, that is, generates an analytic model by dividing the three-dimensional model by assigning a grid pattern to it and determining the validity of each rectangle element, and outputs the analytic model as an intermediate file 31.

The conversion check apparatus 1 according to an embodiment of the present invention numerically represents the differences in shape between the original three-dimensional model and the analytic model converted by the data conversion unit 3. Then the operator can prescribe the equal determination standard using a threshold on the represented values. Furthermore, the conversion check apparatus 1 can practically display the shape change, and the operator can actually determine the acceptability of the analytic model.

The conversion check apparatus 1 checks the analytic model generated by the data conversion unit 3, and is configured by a conversion check facility unit 11, a volume calculation facility unit 12, a surface area calculation facility unit 13, a barycenter position calculation facility unit 14, and a conversion check display facility unit 15. The conversion check facility unit 11 allows the operator to select checking contents, reads the data of the three-dimensional model from the intermediate files 21 and 31, input the data into the volume calculation facility unit 12, the surface area calculation facility unit 13, and the barycenter position calculation facility unit 14, thereby performing the respective calculations. The volume calculation facility unit 12 obtains a change in volume between data before conversion and data after conversion. The surface area calculation facility unit 13 obtains a change in surface area between data before conversion and data after conversion. The barycenter position calculation facility unit 14 obtains a change in position of barycenter between data before conversion and data after conversion. The conversion check display facility unit 15 indicates to the operator the changes between the data before and after conversion obtained by the conversion check facility unit 11, volume calculation facility unit 12, the surface area calculation facility unit 13, and the barycenter position calculation facility unit 14 by displaying each change on the screen or on print display, etc.

Since the conversion check apparatus 1 of the embodiment is for checking for a thermal fluid analysis, the conversion check apparatus 1 makes checks on volume, surface area, and barycenter position changes. However, the present invention is not limited to these applications, but can be applied to a three-dimensional analytic model in other fields of applications.

The operator determines whether or not the analytic model is to be used based on the contents displayed by the conversion check apparatus 1 (step S9), the error of the analytic model does not much affect an analysis result, the analysis unit 4 performs an analyzing process using the analytic model if it is determined that the analytic model can be used in the analyzing process (YES in step S9), and the conditions are amended and the data conversion unit 3 generates another analytic model if the above mentioned analytic model cannot be used in the process (NO in step S9).

The analysis unit 4 performs various analyses such as a thermal fluid analysis, etc. using a three-dimensional model which has passed the check by the conversion check apparatus 1.

The analysis unit 4 reads data from the intermediate file 31 (step S4), fine-tunes the three-dimensional model, and completes an analytic model (step S5). Then, the boundary condition such as the temperature, etc. is set (step S6), an analyzing process is performed (step S7), and an obtained result is displayed (step S8).

Described below are the details of the processes performed the conversion check apparatus 1, the three-dimensional CAD unit 2, the data conversion unit 3, and the analysis unit 4.

Figure 3:
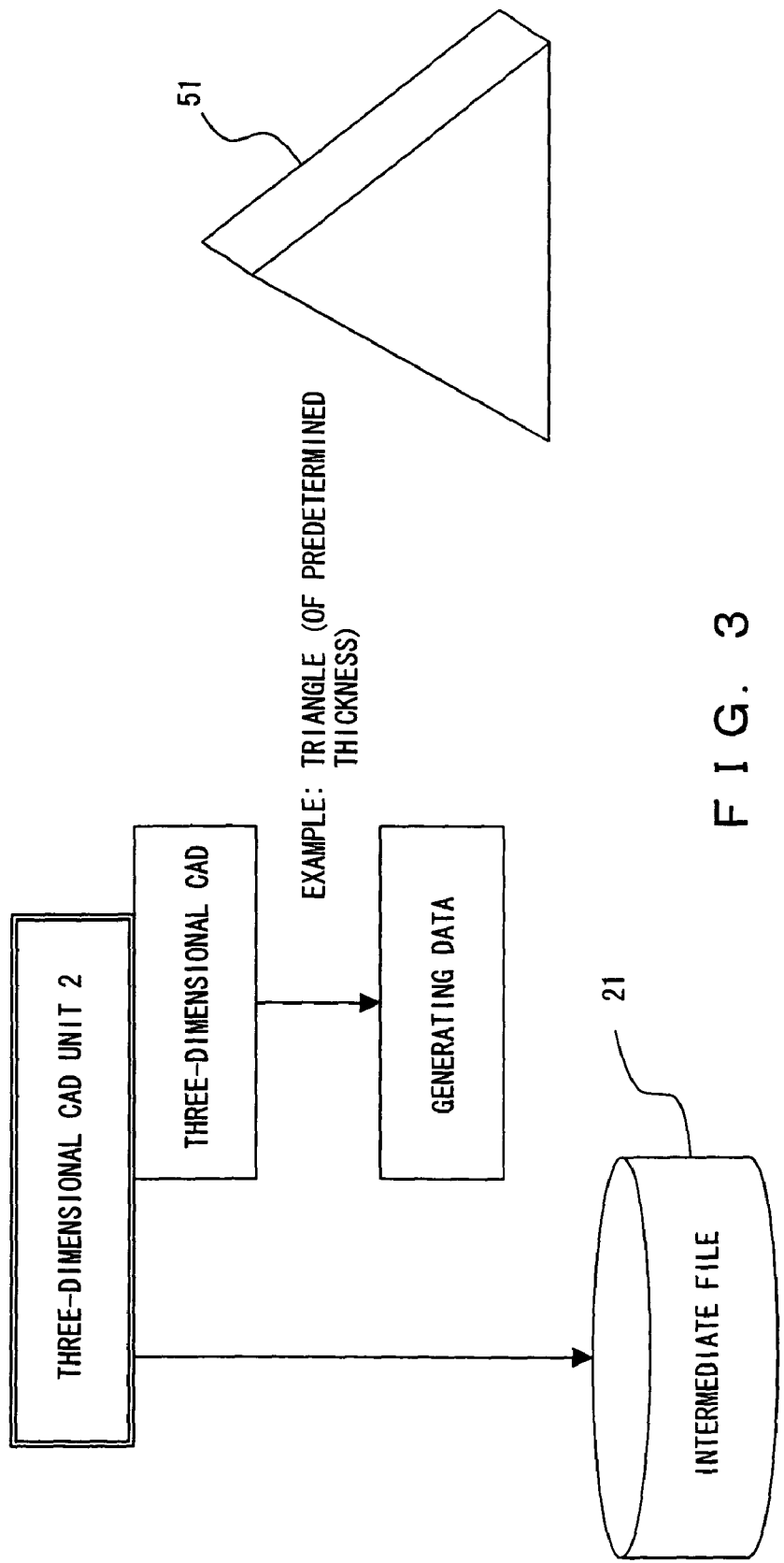
FIG. 3 shows the details of the process performed by a three-dimensional CAD unit.

FIG. 3 shows the details of the process performed by the data conversion unit 3.

The three-dimensional CAD unit 2 performs a process for generating a three-dimensional model of a structure. When the operator inputs an instruction about the shape of a structure using an input appliance such as a mouse, etc. on the screen, the three-dimensional CAD unit 2 generates three-dimensional CAD data based on the input instruction, and outputs the data to the intermediate file 21.

According to the present embodiment, it is assumed that a triangular (or triangular prism) structure 51 having a constant thickness is generated by the three-dimensional CAD unit 2 for ease of explanation.

FIG. 4 shows the details of the process performed by the data conversion unit 3.

The data conversion unit 3 converts the three-dimensional model of the structure generated by the three-dimensional CAD unit 2 into a three-dimensional model for use in the analyzing process performed by the analysis unit 4.

The data conversion unit 3 reads the target data of the three-dimensional model of the structure from the intermediate file 21, and divides the structure of the three-dimensional CAD data into fine rectangular areas by assigning a grid pattern (with given spacing). Each rectangular area is checked whether or not the structure of the three-dimensional CAD data in the rectangular area has a volume of a specified value or more. A rectangular area having a volume of a specified value or more is valid, and the other rectangular area portions are invalid. The valid rectangular area contains a rectangle element of the volume of the size of the rectangular area, and the invalid rectangular area is considered to contain nothing and an analytic model is generated therein, and the generated analytic model is output to the intermediate file 31.

In the example shown in FIG. 4, a three-dimensional model 51 read from the intermediate file 21 is set with grid lines 52 set parallel to (hereinafter referred to as 'in the X direction of') one side of the bottom triangle, and with grid lines 53 perpendicular to (hereinafter referred to as 'in the Y direction of') the grid lines 52 and the bottom plane, at grid interval which is a default value or an operator-specified value (X=12, Y=6). Then, it is determined that the portion where the volume of the three-dimensional model in a rectangular area 54 enclosed by the grid lines 52 and 53 is 50% or more is valid, and the portion where the above mentioned volume is less than 50% is invalid. In the rectangular area of the valid portion, the rectangle element having the same size as the area is set, and the elements are removed from the invalid rectangular area, thereby generating a three-dimensional model 55.

According to the present embodiment, since the thickness of a target structure has a predetermined shape, the structure is assigned a grid pattern by the grid lines 52 and 53 in the two directions X and Y. If the thickness is not uniform, the structure is also assigned a grid pattern in the Z direction perpendicular to the Y and X directions, and represented in a three-dimensional array.

The analytic model generated by the data conversion unit 3 is checked by the conversion check apparatus 1 as to whether or not it can be used in an analyzing process.

Figure 5:
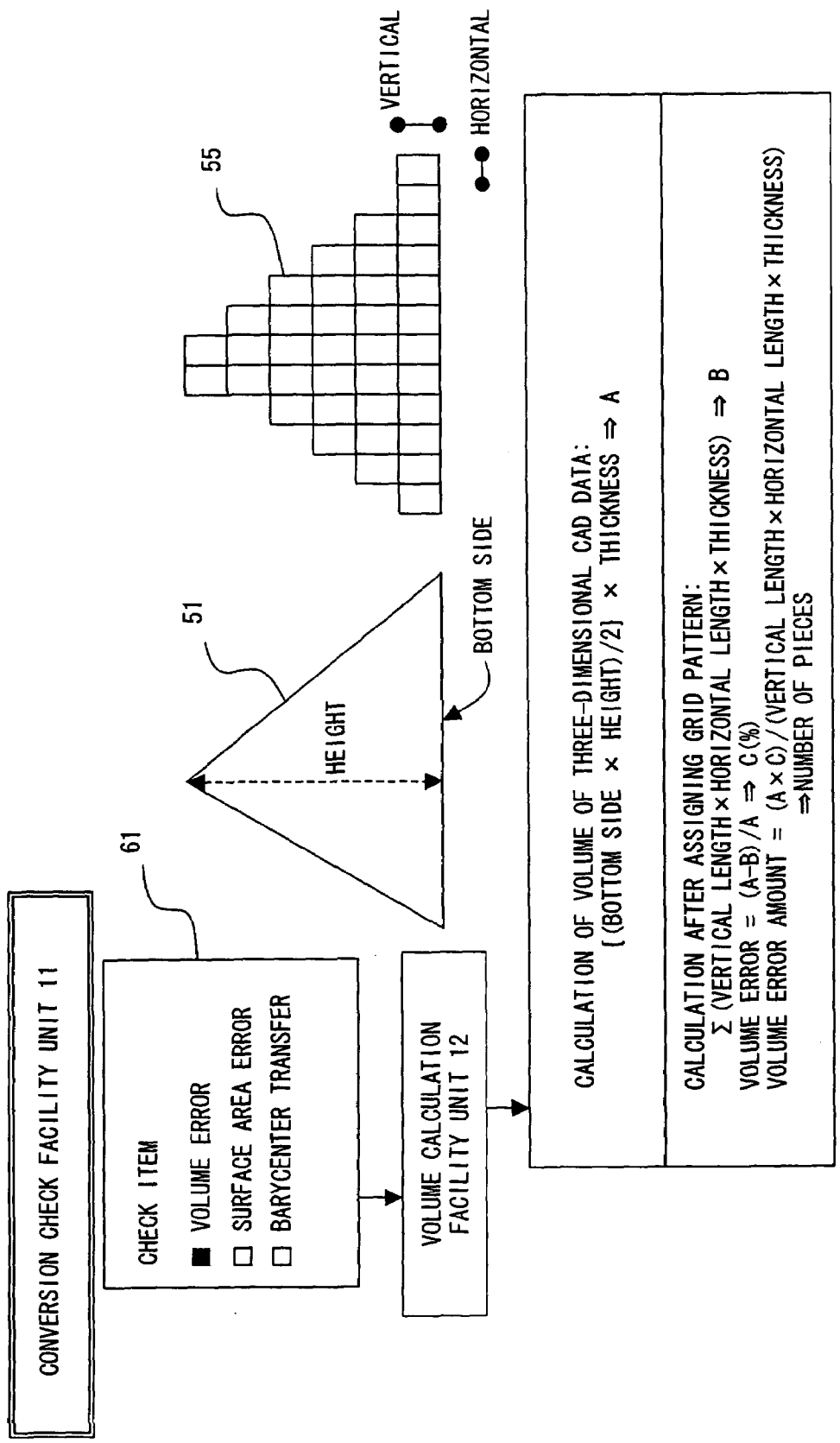
FIG. 5 shows the details of the process performed by the data conversion check facility unit and the volume calculation facility unit.

FIG. 5 shows the details of the process performed by the conversion check facility unit 11 and the volume calculation facility unit 12 of the conversion check apparatus 1.

The conversion check facility unit 11 allows the operator to select one or more checking contents made by the conversion check apparatus 1, and checks a three-dimensional model by the volume calculation facility unit 12, the surface area calculation facility unit 13 and the barycenter position calculation facility unit 14.

The conversion check facility unit 11 displays the check item selection screen 61, and allows the operator to select the contents to be checked. Then, a target three-dimensional model is read from the intermediate files 21 and 31, and input into the volume calculation facility unit 12, the surface area calculation facility unit 13, and the barycenter position calculation facility unit 14 according to one or more check items selected by the operator, thereby performing various calculations.

In FIG. 5, the operator selects a volume error check as a check item, and the conversion check facility unit 11 outputs a three-dimensional model read from the intermediate files 21 and 31 to the volume calculation facility unit 12.

The volume calculation facility unit 12 obtains the volume of the three-dimensional model before conversion by the data conversion unit 3 in the intermediate file 21 and the volume of the three-dimensional model after conversion by the data conversion unit 3 in the intermediate file 31, and calculates the volume error (change amount) between the three-dimensional models before and after conversion, and the volume error amount (error amount from the three-dimensional CAD data).

According to the present embodiment, the three-dimensional CAD unit 2 generates the three-dimensional model 51 having a predetermined thickness of triangular (or triangular prism) shape. Therefore, the volume of the three-dimensional model 51 is obtained by {(bottom line length×height)/2}×thickness.

Furthermore, the volume of the three-dimensional model 55 generated by assigning a grid pattern to the three-dimensional model based on the three-dimensional CAD data by the data conversion unit 3 is obtained by the calculation by (vertical length×horizontal length×thickness), and accumulating the volumes of the obtained rectangle elements.

Then, the volume calculation facility unit 12 calculates ratio between two volumes for a volume error, and the volume error amount indicating the number of rectangle elements in the grid pattern corresponding to the difference in volumes of three-dimensional models before and after conversion.

In FIG. 5, the volume calculation facility unit 12 obtains the volume error C=(A−B)/A and the volume error amount= (A×C)/(vertical length×horizontal length×thickness of rectangle element in grid pattern) from the volume A of the three-dimensional model of the three-dimensional CAD data={(bottom line length×height)/2}×thickness and the volume B of the three-dimensional model after conversion in grid pattern=Σ(vertical length×horizontal length×thickness).

FIG. 6 shows an example of the data structure of the three-dimensional model 55 converted by the data conversion unit 3.

Figures 6A, 6B:
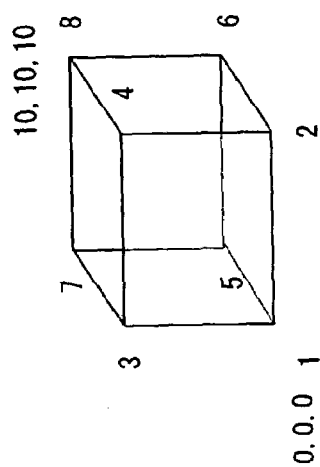
FIGS. 6A and 6B show examples of the data structures of a three-dimensional model converted by the data conversion unit.

The data of the three-dimensional model after conversion has the configuration of recording the coordinates of eight vertexes for each of n rectangle elements forming the three-dimensional model as shown in FIG. 6A.

For the three-dimensional model data after conversion, the coordinate numbers 1 through 8 are determined as shown in FIG. 6 for the eight vertexes of rectangle elements with the vertex (X1, Y1, Z1) of the coordinate number 1 of the rectangle element of the rectangle number 1 is represented by (0.0, 0.0, 0.0), the vertex (X2, Y2, Z2) of the coordinate number 2 is represented by (10.0, 0.0, 0.0), . . . , the vertex (X8, Y8, Z8) of the coordinate number 8 is represented by (10.0, 10.0, 10.0), thereby recording the coordinates of the eight vertexes for all rectangle elements configuring the three-dimensional model.

The calculation of the volume B of the three-dimensional model after conversion in the grid pattern is obtained by calculating the volume of each rectangle element, and then the total volume is obtained from the sum of the calculation results. In the case of the example shown in FIG. 6A, for example, the volume of the rectangle element of the rectangle number 1 is obtained as the horizontal length=X2−X1, the vertical length=Y3−Y1, and the thickness=Z5−Z1. Using the obtained values, the volume (=horizontal length× vertical length×thickness) of the rectangle element of the rectangle number 1 can be obtained. And a total volume of three-dimensional model 55 is obtained by accumulating the obtained volumes of the rectangle elements.

Figure 7:
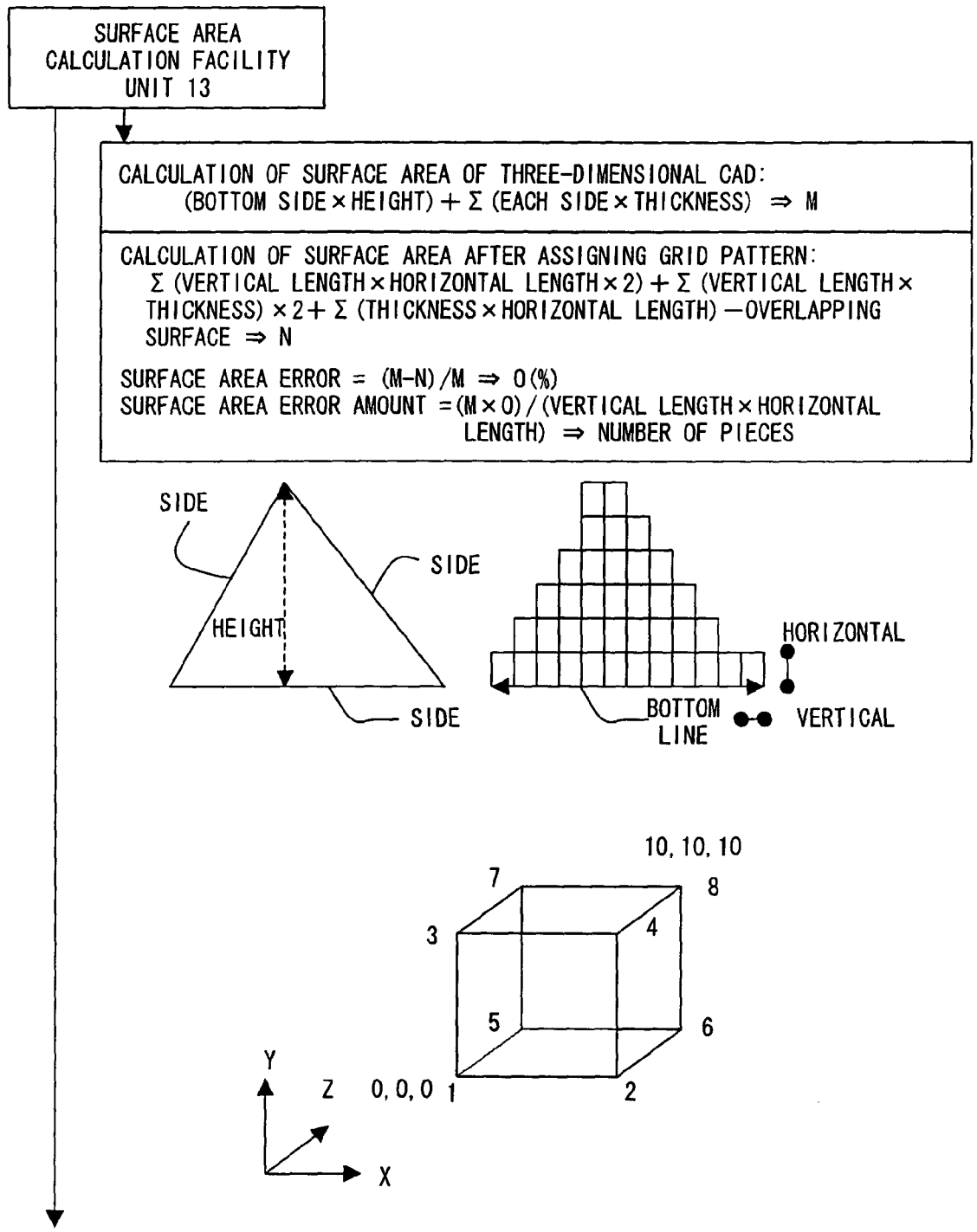
FIG. 7 shows the details of the process performed by the surface area calculation facility unit.

FIG. 7 shows the details of the process performed by the surface area calculation facility unit 13.

The surface area calculation facility unit 13 obtains the surface areas of the three-dimensional model before conversion by the data conversion unit 3 in the intermediate file 21 and the three-dimensional model after conversion by the data conversion unit 3 in the intermediate file 31, and calculates the error (change amount) in the three-dimensional models before and after conversion, and the surface area error amount (the error amount for the three-dimensional CAD data).

In the present embodiment, the three-dimensional CAD unit 2 generates the three-dimensional model 51 having a predetermined thickness of triangular (or triangular prism) shape. Therefore, the surface area M of the three-dimensional model 51 is obtained by (bottom line length× height)+Σ (length of each line×thickness).

Furthermore, the surface area N of the three-dimensional model 55 generated by assigning a grid pattern to the three-dimensional model based on the three-dimensional CAD data by the data conversion unit 3 is obtained by the calculation of (vertical length×horizontal length×2), (horizontal length×thickness×2), and (vertical length×thickness× 2) on each element in the grid pattern, and the obtained values are accumulated.

In an example of obtaining the surface area of the three-dimensional model after conversion in the data shown in FIG. 6, it is assumed that the front side, back side, left side, right side, bottom surface, and top surface respectively have the following vertexes.

front side: coordinate number 1, 2, 4, 3
   back side: coordinate number 5, 6, 8, 7
left side: coordinate number 1, 5, 7, 3 right side: coordinate number 2, 6, 8, 4
bottom surface: coordinate number 1, 2, 6, 5
top surface: coordinate number 3, 4, 8, 7
where the surface area of the rectangle elements of the rectangle number 1 is a sum of the following results.
front and back side (X2−X1)×(Y3−Y1)+(X6−X5)×(Y7−Y5)
left and right side (Y3−Y1)×(Z5−Z1)+(Y4−Y2)×(Z6−Z2)
top and bottom surface (Z5−Z1)×(X2−X1)+(Z7−Z3)×(X5−X1)

Similarly, the surface areas of the rectangle elements of the rectangle numbers 2~n are obtained and the sum of the results is calculated. The surface area of the overlapping surfaces (surfaces having adjacent rectangle elements) is subtracted from the sum.

The search for the overlapping surfaces is, for example, based on the rectangle element of the rectangle number 1, and a surface having matching coordinates of four vertexes with each surface of the rectangle elements of the rectangle number 1 is extracted from the surfaces of the rectangle elements of the rectangle numbers 2~n. Then, based on the rectangle elements of the rectangle number 2, a surface having matching coordinates of four vertexes with each surface of the rectangle elements of the rectangle number 2 is extracted from the surfaces of the rectangle elements of the rectangle numbers 3~n. Similarly, based on the rectangle elements of the rectangle number 3~n, the surface having the matching coordinates of four vertexes is extracted. For example, if the rectangle element of the rectangle number 2 is located on the right of the rectangle elements of the rectangle number 1, then the right side of the rectangle elements of the 1 and the left side of the rectangle elements of the rectangle number 2 have matching coordinates of four vertexes. Therefore, the two sides are to be deleted.

Thus, the areas of the extracted overlapping surfaces are calculated and subtracted from the total surface area of all rectangle elements to obtain the surface area of the three-dimensional model after conversion by the data conversion unit 3.

Then, the surface area calculation facility unit 13 calculates the ratio between two surface areas as a surface area error, and the surface area error amount indicating the number of rectangle elements in the grid pattern corresponding to the difference.

In FIG. 7, the surface area error O=(M−N)/M and surface area error amount=(M×O)/(vertical length×horizontal length×thickness of rectangle elements in grid pattern) is obtained from the surface area M of the three-dimensional model based on the three-dimensional CAD data and the surface area N of the three-dimensional model after conversion in the grid pattern.

Figure 8:
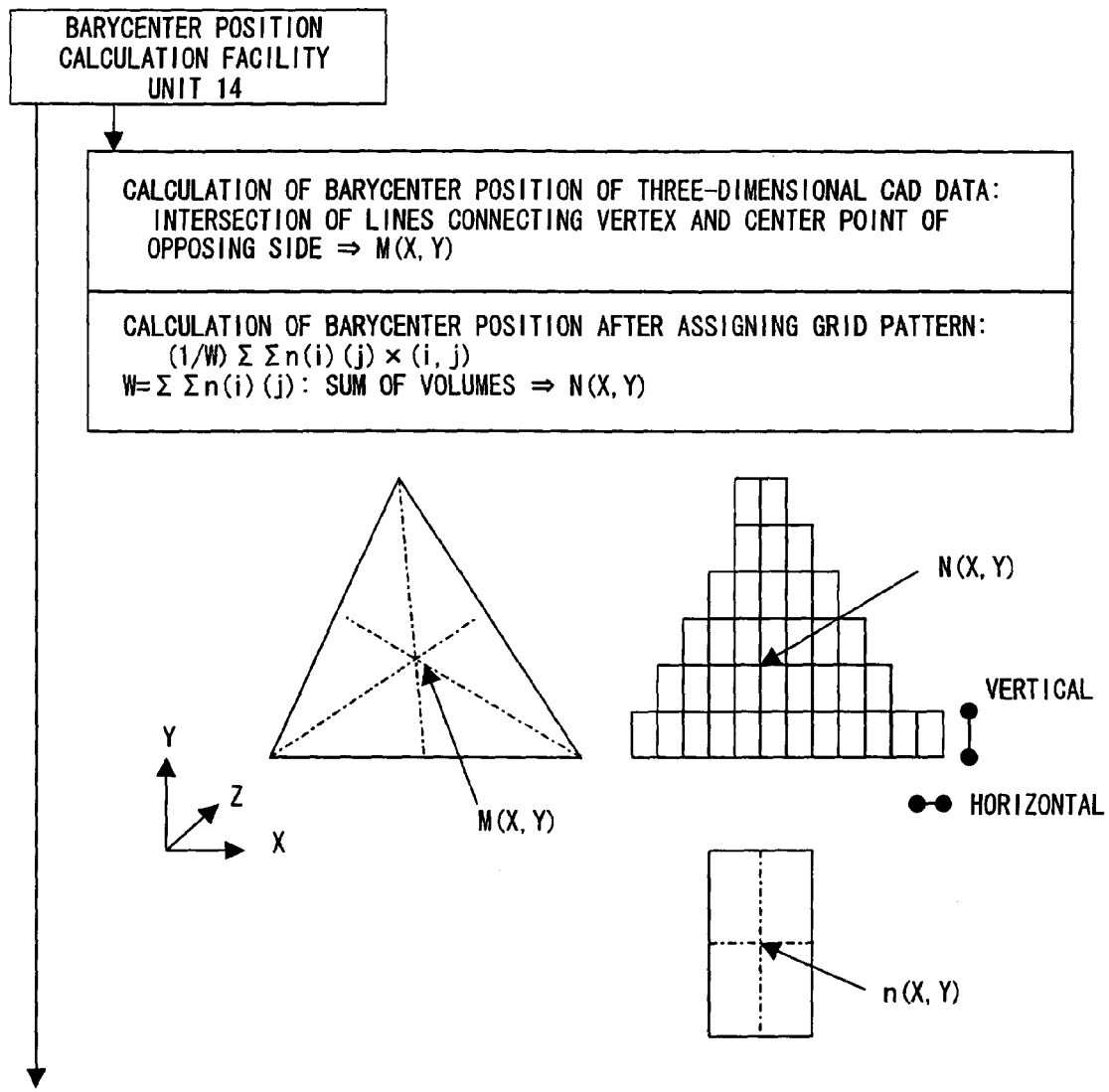
FIG. 8 shows the details of the process performed by the barycenter position calculation facility unit.

FIG. 8 shows the details of the process performed by the barycenter position calculation facility unit 14.

The barycenter position calculation facility unit 14 obtains the barycenter positions of the three-dimensional model before conversion by the data conversion unit 3 in the intermediate file 21 and the three-dimensional model after conversion by the data conversion unit 3 in the intermediate file 31.

In the present embodiment, the three-dimensional CAD unit 2 generates the three-dimensional model 51 having a predetermined thickness of triangular (or triangular prism) shape. Therefore, the barycenter M of the three-dimensional model 51 is obtained by obtaining the intersection of the lines connecting each vertex of the bottom plane of the triangular prism and the center points of the opposing sides.

Furthermore, the barycenter position N (X, Y) of the three-dimensional model 55 generated by assigning a grid pattern to the three-dimensional model based on the three-dimensional CAD data by the data conversion unit 3 is obtained by obtaining the barycenter position of each rectangle element, accumulating the sum of the products obtained by multiplying the distance (i, j) from the barycenter position of each grid element to the origin by the volume n(i) (j) of each grid element, and dividing the result by the total volume W=ΣΣn(i) (j) of the three-dimensional model 55 after conversion.

In an example of obtaining the barycenter position of the three-dimensional model after conversion in the data shown in FIG. 6, the barycenter position of the rectangle elements of the rectangle number 1 is obtained as follows.
coordinates X in X direction: (X1+(X2−X1))/2
coordinates Y in Y direction: (Y1+(Y3−Y1))/2
coordinates Z in Z direction: (Z1+(Z5−Z1))/2

Similarly, the barycenter position is obtained for the rectangle elements of the rectangle numbers 2~n. Then, the X coordinate of the barycenter position N of the three-dimensional model 55 is (1/W) Σ(X×w), the Y coordinate is (1/W)Σ(Y×w), the Z coordinate is (1/W)Σ(Z×w). (The volume w is a volume of the rectangle element.)

FIG. 9 shows an example of the display screen of a check result displayed by the conversion check display facility unit 15.

FIG. 9 shows the results of the checks on volume, surface area, and barycenter, and shows the error display, error amount, barycenter transfer, difference, etc. are displayed in a separated screen based on selection buttons 78*a* through 78*e*.

In the example shown in FIG. 9, a three-dimensional model shape 71 based on the three-dimensional data with barycenter positions 73 is displayed parallel to a three-dimensional model shape 72 after conversion by the data conversion unit 3 with barycenter positions 74, and a volume error 75 and a surface area error 76 of two three-dimensional models are displayed on a % basis as check results. Then, the error amounts of volume and surface area (volume error amount and surface area error amount) are visually displayed with an error amount 77 indicating the number of rectangle elements corresponding to the error of a unit of volume (surface area) of one rectangle element.

On the display screen shown in FIG. 9, when the operator switches ON/OFF of the selection buttons 78*a* through 78*e* on the screen, the display contents can be changed.

In the example shown in FIG. 9, there are a volume error 78*a* indicating the calculation result by the volume calculation facility unit 12, a surface area error 78*b* indicating the calculation result by the surface area calculation facility unit 13, a barycenter 78*c* indicating the calculation result by the barycenter position calculation facility unit 14, a overlap 78*d*, and a difference 78*e*. In the selection buttons, the volume error 78*a*, the surface area error 78*b*, and the barycenter 78*c* are set ON, and the calculation result by the volume calculation facility unit 12, the calculation result by the surface area calculation facility unit 13, and the calculation result by the barycenter position calculation facility unit 14 are displayed.

Figure 10:
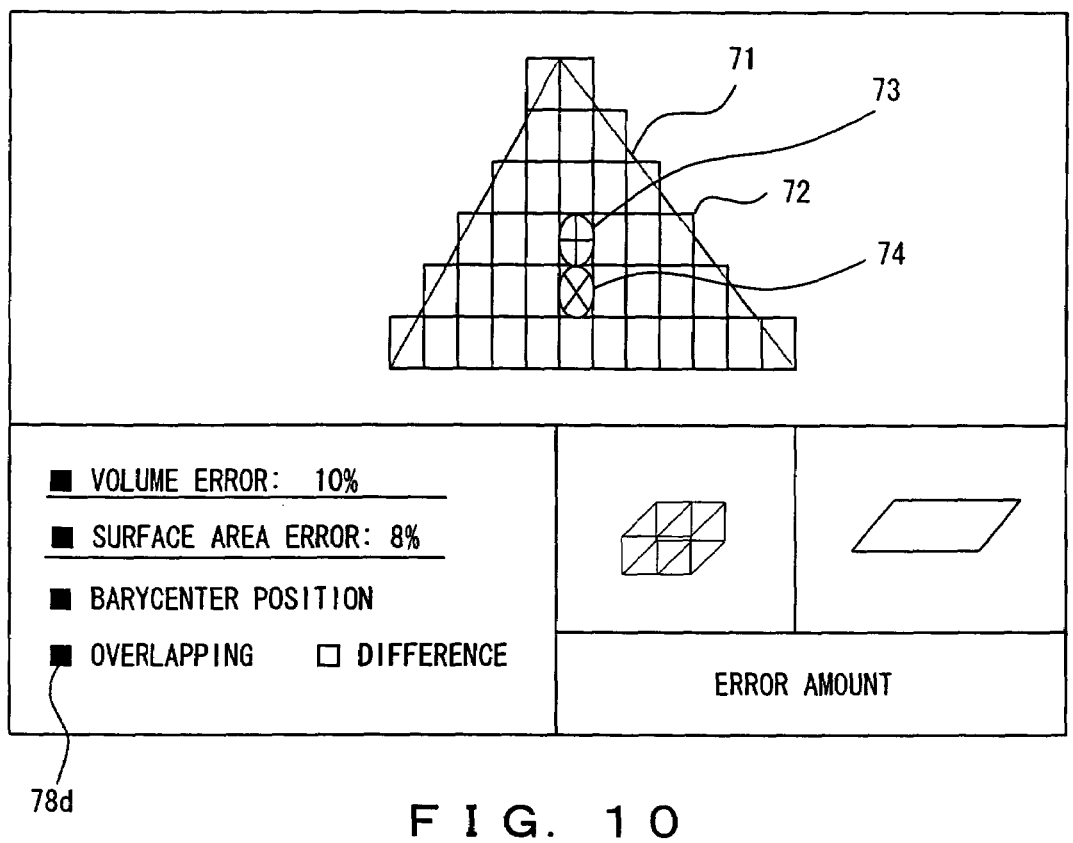
FIG. 10 shows an example of a second display screen of a check result displayed by the conversion check display facility unit.

FIG. 10 shows an example of the display screen where the overlap selection button 78*d* is set ON.

When the overlap selection button 78*d* is set ON, the three-dimensional model shape 71 of the three-dimensional data and the three-dimensional model shape 72 after conversion by the data conversion unit 3 are displayed as overlapped with the barycenter positions 73 and 74 as shown in FIG. 10. At this time, the three-dimensional model shape 71 before conversion is displayed as a semitranslucent image for visibility.

Figure 11:
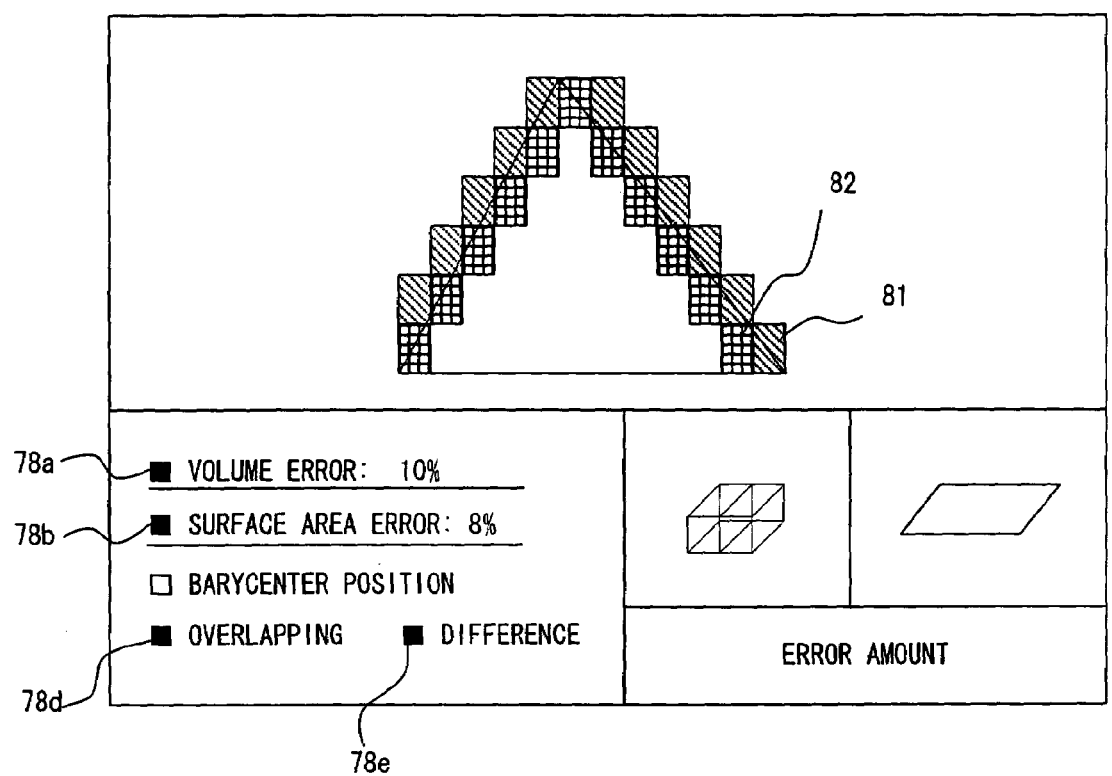
FIG. 11 shows an example of a third display screen of a check result displayed by the conversion check display facility unit.

FIG. 11 shows an example of a display screen where the selection buttons 78a, 78b, 78d and 78e are set ON.

On the display screen shown in FIG. 11, since the difference selection button 78e is set ON, the difference between the shape of the three-dimensional model of three-dimensional data and the shape of the three-dimensional model after conversion by the data conversion unit 3 is visually displayed.

In FIG. 11, for each rectangle element, the portion not completely overlapping between the three-dimensional model shape 71 of three-dimensional data and the three-dimensional model shape 72 after conversion by the data conversion unit 3, that is, the overlapping portions of the shapes by 50% or more~less than 100%, and by less than 50% are respectively represented by diagonal lines and grid lines. That is, between the three-dimensional model shape 71 of three-dimensional data and the three-dimensional model shape 72 after conversion by the data conversion unit 3, the rectangle element having an overlapping portion less than 50% in volume is expressed by diagonal lines 81, and the rectangle element having an overlapping portion by 50% or more~less than 100% is expressed by grid lines 82. In this example, the 100% overlapping grid elements are not specifically expressed, but the differences are emphasized by the shapes 71 and 72.

The operator operates the selection buttons 78a through 78e, and can check the changes in the three-dimensional models before and after conversion. The changes in shape can be expressed numerically or visually. Therefore, the operator can compare values with a threshold, compare errors expressed visually, etc., thereby sufficiently checking the errors of items largely influencing the analyzing process performed by the analysis unit 4.

Then, the operator determines whether the analyzing process by the analysis unit 4 is to be performed using the analytic model, or the conditions are to be changed to allow the data conversion unit 3 to generate an analytic model.

For example, in the thermal fluid analysis, the important items are a volume for heat capacity, and a surface area for a radiation area. The conversion check apparatus 1 according to the present embodiment can present (show) to the user the comparison results between three-dimensional models in volume and surface area numerically (error %). Furthermore, the error in shape is presented, and the difference between current shape and converted shape is displayed.

In the structural analysis field, the shift of the barycenter position is important, and the conversion check apparatus 1 can display the comparison result on the barycenter positions of the three-dimensional models before and after conversion.

Figure 12:
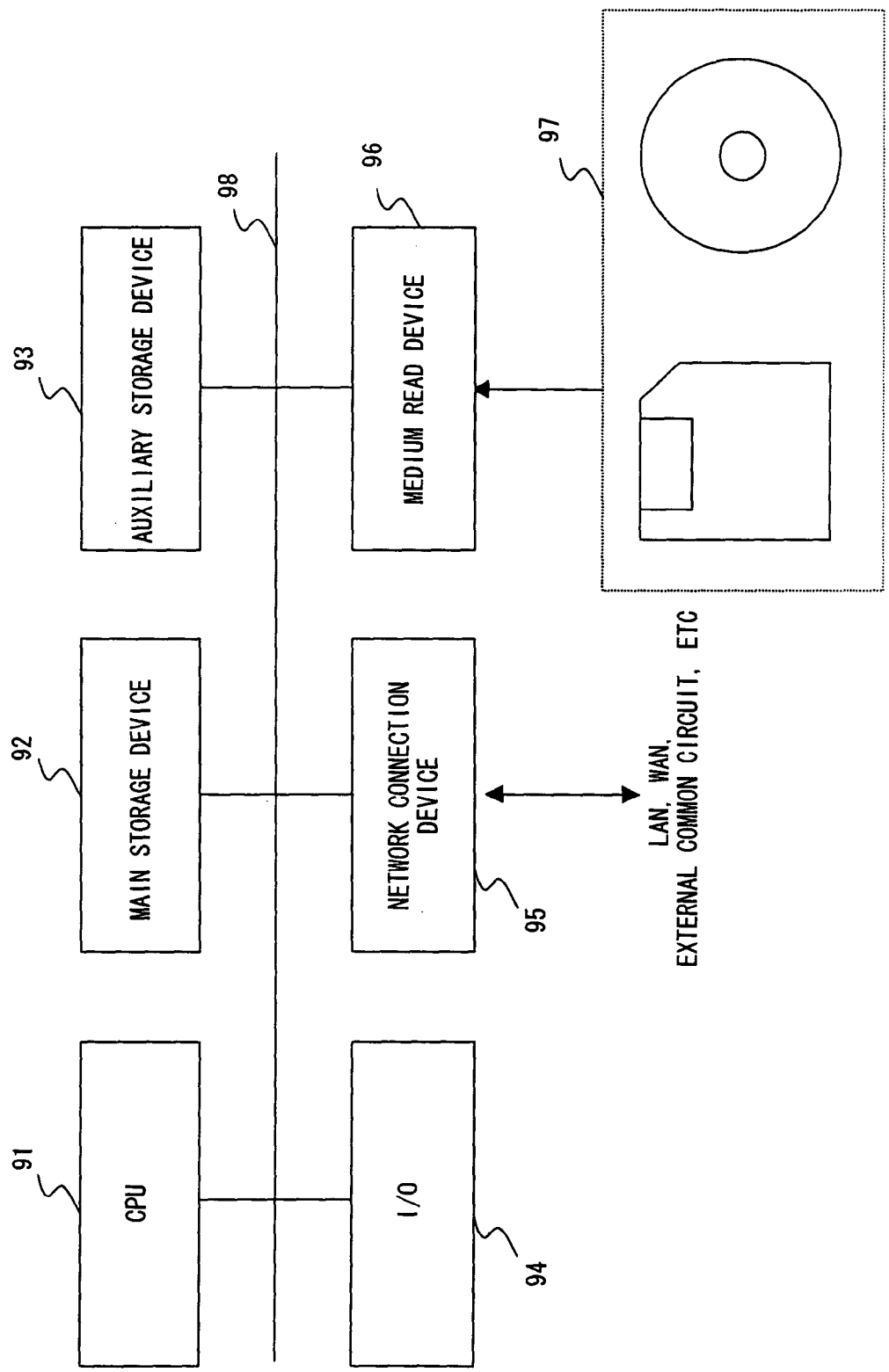
FIG. 12 is a view of the system environment of a computer.

FIG. 12 shows the system environment of the computer where all or a part of the functions of the system shown in FIG. 2 are realized on the computer.

The computer shown in FIG. 12 comprises a CPU 91, a main storage device 92 used as a work area of each program, an auxiliary storage device 93 such as a hard disk, etc. storing each program and a database, an input/output device (I/O) 94 such as a display, a keyboard, etc., a network connection device 95 such as a modem, etc., and a medium read device 96 for reading stored contents from a portable storage medium such as a disk, a magnetic tape, etc. These components are interconnected through a bus 98.

When the functions of the conversion check apparatus 1, the three-dimensional CAD unit 2, the data conversion unit 3, and the analysis unit 4 are realized by software, the CPU 91 reads data from the area of main storage device 92 or the auxiliary storage device 93 by using the main storage device 92 as a work area.

The computer shown in FIG. 12, the medium read device 96 reads a program and data stored on a storage medium 97 such as a magnetic tape, a flexible disk, CD-ROM, MO, etc., and downloads them into the main storage device 92 or the auxiliary storage device 93. Then, each process according to the present embodiment can be realized as a function of software by the CPU 91 executing the program and data.

Furthermore, the computer shown in FIG. 12 can exchange application software using the storage medium 97. Therefore, the present invention is not limited to the conversion check apparatus or the conversion checking method, but can be configured as a program used to direct a computer to perform the functions according to the above mentioned embodiments of the present invention, and the computer-readable storage medium 97 storing the program.

Figure 13:
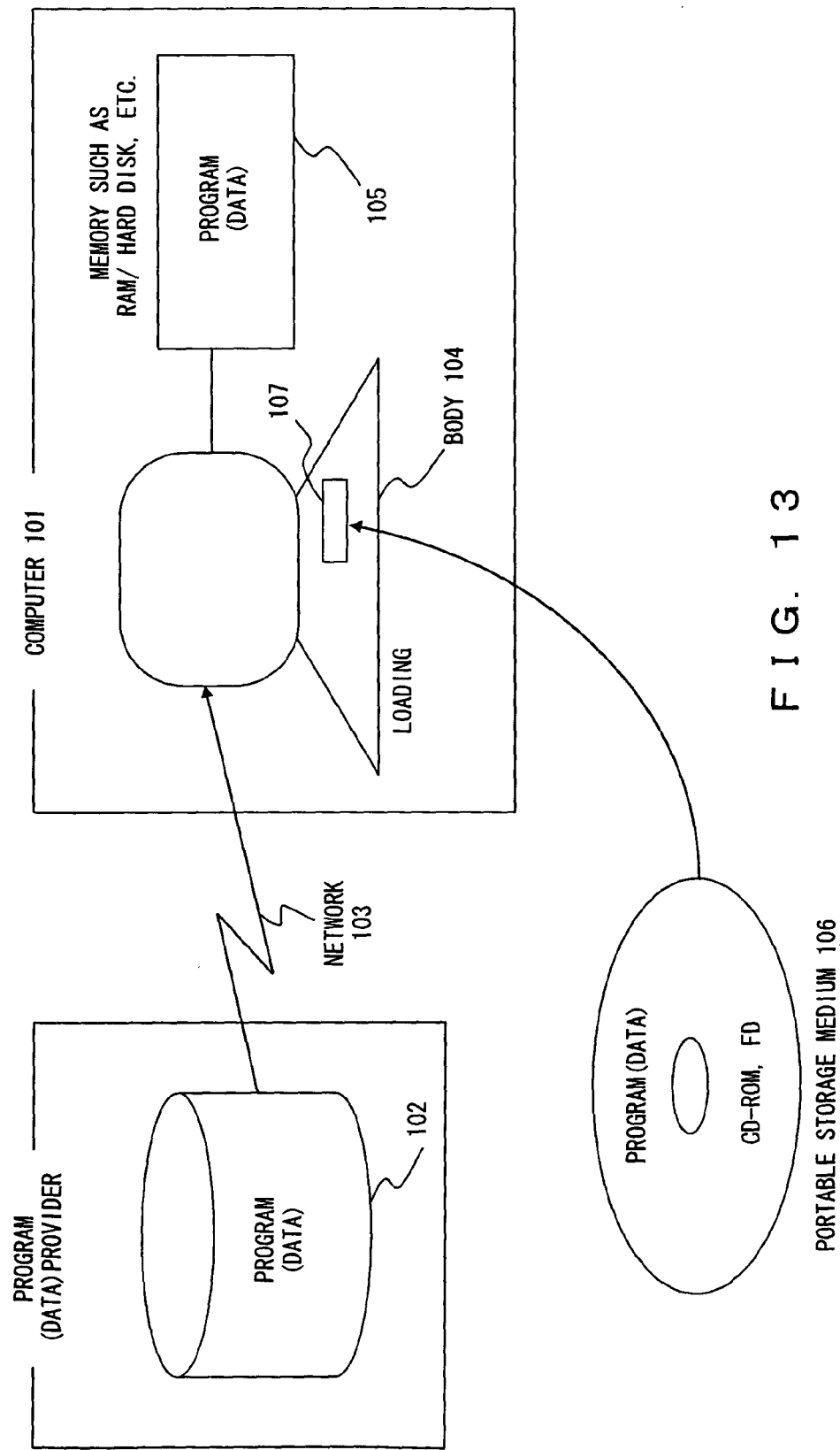
FIG. 13 shows an example of a medium.

In this case, the 'storage medium' can be, for example, a portable storage medium 106 removable from or attachable to the medium drive device 107 such as CD-ROM, a flexible disk (or. MO, DVD, removable hard disk, etc.) as shown in FIG. 13, a storage unit (database, etc.) 102 in an external device (server, etc.) transmitted through a network circuit 103, memory (RAM, a hard disk, etc.) 105, etc. in a body 104 of a computer 101, etc. The program stored in a portable storage medium 106 and the storage unit (database, etc.) 102 is loaded into the memory (RAM, a hard disk, etc.) 105 in the body 104 for execution.

According to the present invention, a unified determination standard can be obtained by numerically representing a change state of the shapes before and after conversion.

Additionally, various items required in checking an analytic model can be visually displayed.

Therefore, an analytic model after conversion can be safely used, and the precision of an analysis result can be improved.

Furthermore, since the changes in shape before and after conversion can be numerically or visually represented, it can be quickly determined whether or not a generated analytic model can be used in an analyzing process, thereby shortening the time required in generating an analytic model.

What is claimed is:

1. A conversion check apparatus which checks an analytic model generated by converting a three-dimensional model for use in an analyzing process, comprising:
 a calculation unit obtaining a difference between the analytic model and the three-dimensional model; and
 a conversion check display unit displaying the difference wherein
 said calculation unit comprises at least one of a volume calculation facility unit for obtaining a difference in volume between the analytic model and the three-dimensional model, a surface area calculation facility unit for obtaining a difference in surface area between the analytic model and the three-dimensional model, and a barycenter calculation facility unit for obtaining a difference in barycenter position between the analytic model and the three-dimensional model.

2. A conversion checking method for checking an analytic model generated by converting a three-dimensional model for use in an analyzing process, comprising:
 obtaining a difference between the analytic model and the three-dimensional model by:

obtaining a difference in volume between the analytic model and the three-dimensional model;

obtaining a difference in surface area between the analytic model and the three-dimensional model; and obtaining a difference in barycenter between the analytic model and the three-dimensional model; and displaying the difference between the analytic model and the three-dimentional model.

3. The method according to claim 2, wherein said difference is numerically displayed.

4. The method according to claim 2, wherein said difference is visually displayed.

5. The method according to claim 2, wherein said difference includes at least one of a difference in volume, a difference in surface area, and a difference in barycenter position.

6. The method according to claim 2, wherein said three-dimensional model and said analytic model are displayed as overlapping each other.

7. The method according to claim 6, wherein a portion not completely overlapping between the three-dimensional model and the analytic model is clearly displayed.

8. The method according to claim 2, wherein said three-dimensional model and said analytic model are displayed together.

9. The method according to claim 2, wherein said analytic model is generated by dividing the three-dimensional model by assigning a grid pattern to the three-dimensional model, and determining validity on each rectangle element.

10. The method according to claim 9, wherein it is determined that the rectangle element is valid when the volume of the three-dimensional model in the grid pattern indicates a rate of a specific value or higher relative to the volume of the rectangular area, and invalid when a value smaller than the specific value is indicated.

11. A computer-readable storage medium storing a program used to direct a computer for checking an analytic model generated by converting a three-dimensional model for use in an analyzing process to perform:

obtaining a difference between the analytic model and the three-dimensional model by:

obtaining a difference in volume between the analytic model and the three-dimensional model;

obtaining a difference in surface area between the analytic model and the three-dimensional model; and obtaining a difference in barycenter between the analytic model and the three-dimensional model; and displaying the difference between the analytic model and the three-dimentional model.

* * * * *

UNITED STATES PATENT AND TRADEMARK OFFICE
CERTIFICATE OF CORRECTION

PATENT NO. : 7,225,112 B2
APPLICATION NO. : 10/646862
DATED : May 29, 2007
INVENTOR(S) : Yasushi Uraki It is certified that error appears in the above-identified patent and that said Letters Patent is hereby corrected as shown below:

Column 11, Line 5, after "barycenter" insert --position--.

Column 11, Line 8, change "three-dimentional" to --three-dimensional--.

Column 12, Line 23, after "barycenter" insert --position--.

Column 12, Line 26, change "three-dimentional" to --three-dimensional--.

Signed and Sealed this

Twentieth Day of May, 2008

JON W. DUDAS
*Director of the United States Patent and Trademark Office*